United States Patent
Göhring et al.

(10) Patent No.: US 7,654,932 B2
(45) Date of Patent: Feb. 2, 2010

(54) OPERATING METHOD FOR A HYBRID DRIVE

(75) Inventors: Markus Göhring, Nufringen (DE); Marco Fleckner, Leonberg (DE); Nils Sauvlet, Bad Essen (DE); Dieter Kraxner, Wurmberg (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 352 days.

(21) Appl. No.: 11/830,018

(22) Filed: Jul. 30, 2007

(65) Prior Publication Data

US 2008/0032857 A1 Feb. 7, 2008

(30) Foreign Application Priority Data

Jul. 28, 2006 (DE) ........................ 10 2006 034 937

(51) Int. Cl.
*B60W 10/08* (2006.01)
(52) U.S. Cl. ............................................. 477/5; 477/6
(58) Field of Classification Search .................... 477/2, 477/3, 4, 5, 6
See application file for complete search history.

(56) References Cited

U.S. PATENT DOCUMENTS 5,806,617 A * 9/1998 Yamaguchi ............ 180/65.235
6,077,186 A * 6/2000 Kojima et al. ................... 477/3
6,109,237 A * 8/2000 Pels et al. ............... 123/339.19
6,116,363 A * 9/2000 Frank ....................... 180/65.25
6,342,027 B1 1/2002 Suzuki
7,017,692 B2 * 3/2006 Grassl et al. ............. 180/65.25

FOREIGN PATENT DOCUMENTS

| DE | 101 63 629 A1 | 7/2003 |
| DE | 100 31 438 A1 | 4/2004 |
| DE | 102 60 435 A1 | 7/2004 |
| DE | 103 27 306 A1 | 1/2005 |
| DE | 10 2004 023 673 A1 | 12/2005 |
| GB | 2 413 998 A | 11/2005 |
| WO | 2004/111441 A1 | 12/2004 |

* cited by examiner

*Primary Examiner*—Ha D. Ho

(57) ABSTRACT

A method operates a drive train the is formed of an internal combustion engine, an electric motor, a transmission and a first clutch that connects the internal combustion engine to the electric motor. During an operating state for applying a current requested torque to a transmission input with the electric motor switched on and the internal combustion engine switched off, the internal combustion engine is connected into the circuit by increasing the torque applied to the drive train by the electric motor before the internal combustion engine starts, in such a way that only the current requested torque is applied to the transmission input. Excess torque is extracted from the drive train by actuating the first clutch and applying the excess torque to the internal combustion engine in order to accelerate it. The internal combustion engine is started when its starting state is reached.

10 Claims, 1 Drawing Sheet

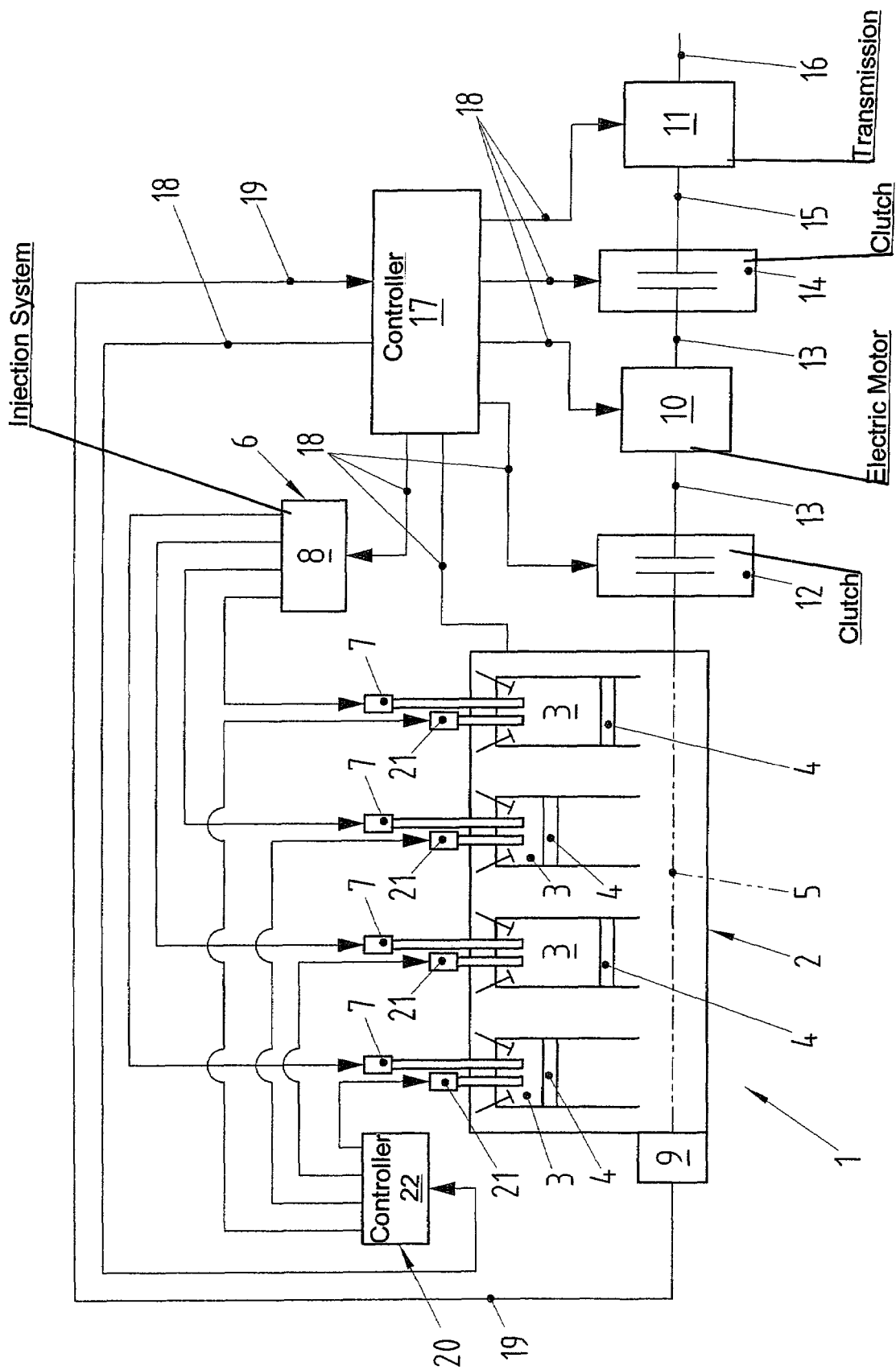

OPERATING METHOD FOR A HYBRID DRIVE

CROSS-REFERENCE TO RELATED APPLICATION

This application claims the priority, under 35 U.S.C. §119, of German application DE 10 2006 034 937.7, filed Jul. 28, 2006; the prior application is herewith incorporated by reference in its entirety.

BACKGROUND OF THE INVENTION

Field of the Invention

The present invention relates to a method for operating a drive train which has an internal combustion engine, an electric motor, a transmission and a first clutch which connects the internal combustion engine to the electric motor.

A drive which is equipped with such a drive train is also referred to as a hybrid drive and is used in particular in modern motor vehicles, in particular passenger automobiles. If the associated drive train is configured in such a way that the internal combustion engine and electric motor can apply torque to the drive train not only alternately but also cumulatively, the term parallel hybrid drive is used.

Such hybrid drives are distinguished by reduced fuel consumption and by reduced emissions of pollutants. In order to reduce weight, it is expedient here to equip the drive train of the hybrid drive with just one electric motor which, on the one hand, is required to apply the torque to the drive train during an electric operating state and with which, on the other hand, the internal combustion engine can be driven to start in order to switch over to a combustion operating state or into a dual operating state. If only one electric motor is present, there is the difficulty, during the electric operating state, of connecting the internal combustion engine into the power train in such a way that torque fluctuations on the drive train can lead to a jolt which can be perceived by the vehicle driver, which is felt to adversely affect comfort. At the same time, there is a requirement for the internal combustion engine to be able to be connected into the power train comparatively quickly in order, for example, to be able to meet a request for increased power from the driver of the vehicle with as little delay as possible. However, in order to be able to achieve the desired spontaneity when starting the internal combustion engine, relatively high torques are usually necessary and these are obtained from the drive train and further increase the undesired torque fluctuations there.

SUMMARY OF THE INVENTION

It is accordingly an object of the invention to provide an operating method for a hybrid drive which overcome the above-mentioned disadvantages of the prior art methods of this general type, which is distinguished in particular by increased comfort when the internal combustion engine is connected into the power train.

With the foregoing and other objects in view there is provided, in accordance with the invention a method for operating a drive train having a circuit formed of an internal combustion engine with cylinders, an electric motor, a transmission and a first clutch connecting the internal combustion engine to the electric motor. During an operating state for applying a current requested torque to a transmission input, with the electric motor switched on and the internal combustion engine switched off, the internal combustion engine is connected into the circuit by the steps of: increasing a torque applied to the drive train by the electric motor before the internal combustion engine starts, such that only the current requested torque is applied to the transmission input; extracting excess torque from the drive train by actuating the first clutch and applying the excess torque to the internal combustion engine to accelerate the internal combustion engine; and starting the internal combustion engine when a starting state is reached.

The invention is based on the general idea that the torque that is necessary to drive the internal combustion engine is applied to the drive train in such a way that there is no resulting increase in torque at the transmission input. The invention utilizes in this context the realization that fluctuations in torque in the drive train lead to a jolt in the drive train that adversely affects the comfort of the driver of the vehicle only if the fluctuations occur between the transmission input and the driven wheels of the vehicle. By measures of the procedure according to the invention, the transmission input is largely decoupled from the application of torque to the drive train so that in an ideal case the increase in torque which is introduced into the drive train by the electric motor occurs as it were without jolts and cannot be perceived by the driver of the vehicle. The torque that is additionally introduced into the drive train using the electric motor is not required to apply a current requested torque, which is dependent on the current request of the driver, to the drive train, but rather is superfluous. The superfluous torque can then be extracted from the drive train by corresponding actuation of the first clutch in order thus to accelerate the internal combustion engine. Since generally only the excess torque is extracted from the drive train in order to accelerate and start the internal combustion engine, the starting process per se does not affect the application of torque to the transmission input. In an ideal case, the starting process of the internal combustion engine can thus be carried out without jolts.

According to one advantageous embodiment, the torque which is applied to the drive train using the electric motor can be increased by increasing the rotational speed of the electric motor compared to a rated rotational speed which is assigned to the current operating state of the drive train, while at the same time a second clutch which connects the electric motor to the transmission is actuated in such a way that the amount of torque transmitted to the transmission input is selectively reduced in such a way that only the current requested torque continues to be applied to the transmission input. In this embodiment, the kinetic energy of the drive train is increased before the internal combustion engine is accelerated or started, by virtue of the fact that the rotational speed of the electric motor is increased. Before the internal combustion engine is accelerated, the additionally provided kinetic energy is not required and it is discharged from the drive train via the second clutch, in particular in the form of heat. When the internal combustion engine is accelerated, the actuation of the first clutch permits the excess kinetic energy to be used to accelerate the internal combustion engine, and in the process the discharging of energy via the second clutch is correspondingly reduced.

In order to drive or accelerate the internal combustion engine using excess kinetic energy of the drive train, the first clutch can preferably be actuated in such way that torque is applied to the internal combustion engine in a pulse-like fashion in order to be able to accelerate the internal combustion engine in the shortest possible time. As a result, the responsive behavior in terms of spontaneity can be improved.

In another embodiment, the torque which is applied to the drive train by the electric motor can be increased by actuating the first clutch in such a way that it increasingly extracts torque from the drive train and applies it to the internal combustion engine, while at the same time the electric motor is actuated so as to correspondingly increase the application of torque. The activations of the first clutch and of the electric motor are matched to one another in such a way that the torque which is applied to the drive train by the electric motor corresponds generally to the torque which is extracted again from the drive train by the first clutch and is transmitted to the internal combustion engine, so that in total only the current requested torque continues to be applied to the transmission input. In this embodiment, the increased power drain of the electric motor is thus converted directly into driving power at the internal combustion engine.

In another advantageous embodiment it is possible to provide that the internal combustion engine reaches its starting status as soon as the respective piston in one of its cylinders has carried out a complete compression stroke in order to compress fresh gas, in which case the internal combustion engine is then started by selectively injecting fuel into the aforesaid cylinder and by igniting the fuel/fresh gas mixture in this cylinder. The subsequent expansion stroke in this one cylinder already contributes significantly to accelerating the internal combustion engine. As a result, the energy that has to be applied by the electric motor in order to accelerate the internal combustion engine can be considerably reduced, while, at the same time, the time required for the starting process is reduced. Such a fast starting method is made possible for the internal combustion engine by use of modern fuel injection systems and engine controllers which are informed about the current position of the piston in the respective cylinder, for example by sensing the crankshaft angle.

The features which are mentioned above and are also to be explained below can, of course, be used not only in the respectively specified combination but also in other combinations or in isolation without departing from the scope of the present invention.

Other features which are considered as characteristic for the invention are set forth in the appended claims.

Although the invention is illustrated and described herein as embodied in an operating method for a hybrid drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a highly simplified circuit diagram-like basic illustration of a drive train.

DETAILED DESCRIPTION OF THE INVENTION

Referring now to the single FIGURE of the drawing, there is shown a drive train 1 that contains an internal combustion engine 2 with a plurality of cylinders 3 in which pistons 4 are mounted with an adjustable stroke in the usual fashion. The pistons 4 have drive connections in the usual way (not shown) by connecting rods to a crankshaft 5 that is indicated here by a dot-dashed line. The internal combustion engine 2 is equipped with a fuel injection system 6 that has an injection nozzle 7 for each cylinder 3 and contains an injection controller 8 with which the injection nozzles 7 can be activated. The cylinders 3 are also equipped in a conventional fashion with gas exchange valves (not designated in more detail). A fresh gas supply, an exhaust gas discharge system and a fuel supply are present in the customary manner but are not shown here for the sake of simplified illustration. Furthermore, the internal combustion engine 2 is also provided with a crankshaft sensor 9 with which the current crankshaft angle, by which the current position of each piston 4 in the associated cylinder 3 can be sensed and determined.

Furthermore, the internal combustion engine 2 is equipped with an ignition system 20 that has an ignition device 21, in particular a spark plug, for each cylinder 3. The individual ignition devices 21 can be activated by an ignition controller 22.

The drive train 1 also contains an electric motor 10 and a transmission 11, in particular an automatic transmission 11. The electric motor 10 is connected to the internal combustion engine 2 via a first clutch 12. For this purpose, the first clutch 12 is connected, on the one hand, to the crankshaft 5 of the internal combustion engine 2, and, on the other hand, to a drive shaft 13 of the electric motor 10. The first clutch 12 can be configured, for example, as a disengaging clutch. Furthermore, the electric motor 10 is connected in the example to the transmission 11 via a second clutch 14. For this purpose, the second clutch 14 is connected, on the one hand, to the drive shaft 13 of the electric motor 10 and, on the other hand, to the transmission input 15 of the transmission 11. The second clutch 14 can be configured, for example, as a torque converter with an integrated converter lock up clutch or as a pure clutch. Pure friction clutches are conceivable both for the first clutch 12 and for the second clutch 14. The second clutch 14 may be integrated, in particular, into the transmission 11. A transmission output 16 of the transmission 11 permits the drive power that is supplied by the drive train 1 to be tapped.

The drive train 1 is preferably disposed in a motor vehicle, in particular in a passenger automobile. The transmission output 16 then drives the driven wheels of the vehicle. The drive train 1 has different operating principles with the internal combustion engine 2 and the electric motor 10 and is therefore referred to as a hybrid drive. If the two different drive concepts can be active simultaneously, the drive is a parallel hybrid drive.

In order to actuate the individual components of the drive train 1, a controller 17 is provided which can actuate the injection controller 8, the ignition controller 22, the internal combustion engine 2, the clutches 12, 14, the electric motor 10 and the transmission 11 via corresponding control lines 18. The controller 17 receives, for example, a sensor signal from the crankshaft sensor 9 via a signal line 19.

The drive train 1 according to FIGURE can be operated according to the invention as now described.

A current requested torque is to be applied to the transmission input 15 using the drive train 1. The requested torque can depend on different peripheral conditions. If the drive train 1 is disposed in a vehicle, the requested torque depends primarily on the request by the driver of the vehicle. The requested torque can, depending on the request by the driver of the vehicle, be constant over a relatively long period of time or vary. In an electric operating state, the requested torque can be generated exclusively using the electric motor 10. The electrical operating state is suitable, for example, for town journeys of the vehicle that is equipped with the drive train 1. In a combustion operating state, the respective requested torque is generated exclusively using the internal combustion engine 2. The combustion operating status is suitable, for example, for overland journeys or freeway journeys. At the same time, in the combustion operating state a vehicle battery, which makes available the current for operating the electric motor 10, can be charged if the internal combustion engine 10 supplies excess energy in the combustion operating state. In particular, it is possible here for the electric motor 10 to be operated as a generator. In a dual operating state, the respective requested torque is generated with the internal combustion engine 2 and the electric motor 10 in combination. This dual operating state can be used, for example, to optimize the acceleration of the vehicle.

During the electric operating state, that is to say during an operating state with the electric motor 10 switched on and the internal combustion engine 2 switched off, it may be necessary, under certain conditions, for the internal combustion engine 2 to be switched on or connected in the power train. For example, in order to change from the electric operating state into the combustion operating state or into a dual operating state. The change of operating state is to be implemented as far as possible without adversely affecting comfort for the driver of the vehicle. Moreover, a fast response behavior, that is to say quick connection of the internal combustion engine 2 into the power train, is also desired.

In order to be able to meet the requirements for increased comfort and short response time, during the electric operating state the torque which is applied to the drive train 1 using the electric motor 10 is increased directly before the internal combustion engine 2 starts, the increase being specifically such that in the process only the current requested torque continues to be applied to the transmission input 15. The increase in torque within the drive train 1 therefore cannot be felt at the transmission input 15. To this extent, the increase in torque in the drive train 1 occurs without jolts. This is because, in the case of an increase in torque in the drive train 1, a jolt that can be felt by the driver of the vehicle occurs only if the increase in torque in the drive train 1 occurs between the transmission input 15 and the driven wheels of the vehicle. By virtue of the increase in the torque in the drive train 1, the latter receives excess energy. This can then be extracted from the drive train 1 again through corresponding actuation of the first clutch 12, and can be simultaneously applied to the crankshaft 5 in order to accelerate the internal combustion engine 2. The excess energy that is applied to the drive train 1 using the electric motor 10 is thus used to accelerate the internal combustion engine 2. As soon as the internal combustion engine 2 reaches a starting state, it can be started. The actual starting of the internal combustion engine 2 is carried out by correspondingly actuating the fuel injection system 6 and the ignition system 20.

In accordance with one embodiment, the torque which is applied to the drive train 1 by the electric motor 10 can be increased by virtue of the fact that the rotational speed of the electric motor 10 is increased, specifically in relation to a rated rotational speed which is assigned to the current operating state of the drive train 1. The increased rotational speed allows the electric motor 10 to transmit more kinetic energy into the drive train. For as long as this excess energy is not used to start or accelerate the internal combustion engine 2, the transmission of the excess energy or of the excess torque to the transmission input 15 must be avoided. This is achieved by correspondingly actuating the second clutch 14. The latter is actuated for this purpose in such a way that the torque that is transmitted to the transmission input 15 is reduced. The increase in torque in the drive train 1 is thus not applied by the second clutch 14 to the transmission input 15. Instead, the torque applied to the transmission input 15 in the second clutch 14 continues to be only of such a magnitude that it continues to generate the respective current requested torque. The excess energy is extracted here from the transmission train 1 in the second clutch 14. For example, for this purpose the excess energy in the second clutch 14 is converted into heat and irradiated into the surroundings.

As soon as the drive train 1 contains sufficient kinetic energy to start or accelerate the internal combustion engine 2, torque is extracted from the drive train 1 by correspondingly activating the first clutch 12 and the torque is supplied to the internal combustion engine 2 in order to accelerate it. This extraction of torque eliminates the excess energy in the drive train 1 in this context. As the transmission of energy or torque to the internal combustion engine 2 via the first clutch 12 increases, the second clutch 14 is actuated in a complementary fashion to this in such a way that the energy that is not transmitted to the transmission input 15 via the second clutch 14 is reduced to a corresponding degree. In this context, the actuation of the two clutches 12, 14 is matched in such a way that the electric motor 10 is braked at most to its rated rotational speed, while, on the one hand, the internal combustion engine 2 is accelerated and, on the other hand, the current requested torque continues to be applied to the transmission input 15. The first clutch 12 is preferably actuated by the controller 17 in such a way that the kinetic energy which is supplied by the increased rotational speed of the electric motor 10 in the drive train 1 is applied as it were in a pulse-like fashion to the internal combustion engine 2 in order to accelerate the latter in as brief a time as possible.

So that the second clutch 14 can reduce the torque transmitted to the transmission input 15 when the electric motor 10 has an increased rotational speed, the clutch 14 can increase slip which occurs between the clutch input and clutch output. In order to increase again the amount of torque transmitted to the transmission input 15, the second clutch 14 can correspondingly reduce the slip between the clutch input and clutch output.

In another embodiment in which it is possible, in particular, to dispense with the second clutch 14, the electric motor 10 can also increase the torque applied to the drive train 1 by virtue of the fact that torque is increasingly extracted from the drive train 1 via the first clutch 12 while at the same time the electric motor 10 is actuated in such a way that it sets a corresponding, compensating increase in the application of torque to the drive train 1. The electric motor 10 is actuated here in such a way that, despite the load that additionally acts on the drive train 1 via the first clutch 12, only the current requested torque continues to be applied to the drive train 15. In this context, the internal combustion engine 2 is not connected into the drive train in the manner of a pulse but rather more "gently" so that the electric motor 10 can be adjusted in a compensating fashion by, for example, corresponding closed-loop control circuits or corresponding actuation by an increased load take-up.

It is clear that during the connection of the internal combustion engine 2 into the power train, the current requested torque is preferably constant. However, it is also basically conceivable for the current requested torque to change during the connection process at the request of the driver and independently of the connection process. The drive train 1 as usual allows for this change in the current requested torque by, in particular, increasing or reducing the power drain of the electric motor 10 and/or by increasing or reducing the slip in the second clutch 14.

As soon as the predetermined starting state of the internal combustion engine 2 has been reached as it accelerates, the actual starting process of the internal combustion engine 2 takes place. The starting state is reached, for example, when the internal combustion engine 2 reaches a predetermined starting speed. The starting of the internal combustion engine 2 corresponds then to a customary starting process in which the injection system 6 and the ignition system 20 synchronize during several revolutions of the crankshaft 5.

In another embodiment it is possible to provide for a rapid starting process to be carried out for the internal combustion engine 2 at least when connection into the power train occurs. During such a rapid starting process, the internal combustion engine 2 already reaches its starting state when the associated piston 4 in the first of its cylinders 3 has carried out one complete compression stroke during which it compresses sucked-in fresh gas. Therefore, complete charging with fresh gas must have taken place at one of the cylinders 3 and the charge has to have been compressed. By use of the crankshaft sensor 9, the controller 17 detects the current crankshaft angle and thus the current position of each piston 4 in the respective cylinder 3. The controller 17 thus knows precisely when and at which cylinder 3 the associated piston 4 has carried out the complete compression stroke first. By the injection system 8, the cylinder 3 is then selectively supplied with fuel by injecting the suitable quantity of fuel via the injection nozzle 7. By use of the ignition system 20, the fuel/fresh gas mixture that is formed is ignited precisely in this cylinder 3 by the corresponding ignition device 21. The subsequent expansion stroke of the respective piston 4 drives the crankshaft 5 and brings about an additional acceleration of the internal combustion engine 2. A short time later, the next ignition process can already be carried out. In this rapid starting method, the crankshaft 5, the injection system 6 and the ignition system 20 are, as it were, synchronized from the beginning, as a result of which the internal combustion engine 2 can be started extremely quickly. Such a rapid starting method can be implemented in particular in a spark ignition engine with direct injection.

The rapid starting of the internal combustion engine 2 permits the kinetic energy which is to be provided using the electric motor 10 in order to start or turn the crankshaft 5 to be relatively small. This also has a positive effect on the comfort and the spontaneity of the process of connection into the drive train.

After the starting of the internal combustion engine 2, the controller 17 carries out synchronization of the electric motor 10 and of the internal combustion engine 2 in order to approximate their rotational speeds to one another. Only then can the first clutch 12 be completely closed in order to transmit torque without slip between the crankshaft 5 and drive shaft 13.

Then, at first a dual operating state is present in which the electric motor 10 and the internal combustion engine 2 apply torque to the drive train 1 which is of such a magnitude in total that the current requested torque is still applied to the transmission input 15. If necessary, it is possible to change over into the combustion operating state after the dual operating state or immediately after the synchronization of the electric motor 10 and internal combustion engine 2. To do this, the controller 17 operates the internal combustion engine 2 in such a way that it applies torque to the drive train 1 with such a magnitude that the current requested torque is applied to the transmission input 15. At the same time, the electric motor 10 is switched off. If the internal combustion engine 2 has power reserves and if the batteries for operating the electric motor 10 have to be charged, the internal combustion engine 2 can also transmit a corresponding power surplus to the drive train 1, which can then be extracted again from the drive train 1 via a corresponding generator, in particular via the electric motor 10 which is operated as a generator. In this charge state it is also possible to continue applying only the current requested torque to the transmission input 15.

The invention claimed is:

1. A method for operating a drive train having a circuit formed of an internal combustion engine with cylinders, an electric motor, a transmission and a first clutch connecting the internal combustion engine to the electric motor, which comprises the steps of:
    during an operating state for applying a current requested torque to a transmission input, with the electric motor switched on and the internal combustion engine switched off, the internal combustion engine being connected into the circuit by the steps of:
        increasing a torque applied to the drive train by the electric motor before the internal combustion engine starts, such that only the current requested torque is applied to the transmission input;
        extracting excess torque from the drive train by actuating the first clutch and applying the excess torque to the internal combustion engine to accelerate the internal combustion engine; and
        starting the internal combustion engine when a starting state is reached.

2. The method according to claim 1, which further comprises increasing the torque applied to the drive train by the electric motor, by increasing a rotational speed of the electric motor on a basis of a rated rotational speed assigned to a current operating state of the drive train, and at a same time, actuating a second clutch connecting the electric motor to the transmission to reduce an amount of the torque transmitted to the transmission input such that only the current requested torque is applied to the transmission input.

3. The method according to claim 2, which further comprises accelerating the internal combustion engine by actuating the first clutch to apply torque to the internal combustion engine in a pulse-like fashion such that the electric motor is braked at most to a current rate of rotational speed while at a same time, actuating the second clutch to increase the amount of the torque transmitted to the transmission input such that the current requested torque is applied to the transmission input.

4. The method according to claim 2, which further comprises performing at least one of:
    reducing the amount of the torque transmitted to the transmission input by the second clutch increasing slip between clutch input and clutch output; and
    increasing the amount of the torque transmitted to the transmission input by the second clutch reducing slip between the clutch input and the clutch output.

5. The method according to claim 1, which further comprises increasing an amount of the torque applied to the drive train by the electric motor by actuating the first clutch such that the first clutch increasingly extracts torque from the drive train, while at a same time, actuating the electric motor to correspondingly increase an application of the torque so that only the current requested torque is applied to the transmission input.

6. The method according to claim 1, which further comprises determining the starting state of the internal combustion engine in dependence on a predetermined starting rotational speed.

7. The method according to claim 1, which further comprises:
    determining that the internal combustion engine has reached the starting state as soon as a respective piston in one of the cylinders has carried out a complete compression stroke to compress fresh gas; and starting the internal combustion engine by selectively injecting fuel into the one cylinder and by igniting the fuel in the one cylinder.

8. The method according to claim 1, which further comprises synchronizing the electric motor and the internal combustion engine in terms of rotational speed after the internal combustion engine has been started.

9. The method according to claim 8, wherein after the electric motor and the internal combustion engine have been synchronized, setting the torque applied in total to the drive train by the electric motor and the internal combustion engine such that the current requested torque is applied to the transmission input.

10. The method according to claim 8, wherein after the electric motor and the internal combustion engine have been synchronized, switching off the electric motor and setting the torque applied to the drive train by the internal combustion engine such that the current requested torque is input into the transmission input.

* * * * *